US008430193B2

(12) United States Patent
Ve Lasco et al.

(10) Patent No.: US 8,430,193 B2
(45) Date of Patent: Apr. 30, 2013

(54) SIDE CONVERGER FOR VEHICLE FRONT FACE STRUCTURE, CORRESPONDING FRONT FACE STRUCTURE, AND METHOD FOR ASSEMBLING SUCH A STRUCTURE

(75) Inventors: Angel Ve Lasco, Voisins le Bretonneux (FR); Matthieu Carron, Montigny le Bretonneaux (FR); Juliette Massoulie, Gambias (FR)

(73) Assignee: Renault s.a.s., Boulogne-billancourt (FR)

( * ) Notice: Subject to any disclaimer, the term of this patent is extended or adjusted under 35 U.S.C. 154(b) by 163 days.

(21) Appl. No.: 12/989,314

(22) PCT Filed: Mar. 23, 2009

(86) PCT No.: PCT/FR2009/050494
§ 371 (c)(1),
(2), (4) Date: Feb. 2, 2011

(87) PCT Pub. No.: WO2009/130429
PCT Pub. Date: Oct. 29, 2009

(65) Prior Publication Data
US 2011/0155491 A1 Jun. 30, 2011

(30) Foreign Application Priority Data
Apr. 22, 2008 (FR) .................................. 08 02231

(51) Int. Cl.
*B60K 11/00* (2006.01)
(52) U.S. Cl.
USPC .......................... 180/68.1; 180/68.2; 180/68.3

(58) Field of Classification Search ................. 180/68.1, 180/68.2, 68.3, 68.4; 165/202, 204, 42, 43
See application file for complete search history.

(56) References Cited

U.S. PATENT DOCUMENTS

| 5,476,138 | A  | * | 12/1995 | Iwasaki et al. | ............... | 180/68.4 |
| 6,540,037 | B2 | * | 4/2003  | Sasano et al.  | ................ | 180/68.1 |
| 6,883,589 | B2 | * | 4/2005  | Ozawa et al.   | ................ | 180/68.1 |

(Continued)

FOREIGN PATENT DOCUMENTS

| DE | 20 2007 024898 | 2/2008 |
| EP | 1 352 810 | 10/2003 |
| EP | 1 785 306 | 5/2007 |

OTHER PUBLICATIONS

U.S. Appl. No. 12/988,565, filed Oct. 19, 2010, Carron, et al.

(Continued)

*Primary Examiner* — Hau Phan
(74) *Attorney, Agent, or Firm* — Oblon, Spivak, McClelland, Maier & Neustadt, L.L.P.

(57) ABSTRACT

A side diffuser for a vehicle front surface structure, the vehicle front surface structure, and a method for assembling such a structure. The side diffuser guides air entering through air inlets from bumpers of the vehicle to heat exchangers located in front of the engine. The diffuser includes a plate, the back edge of which supports the heat exchangers and the front edge of which supports the bumpers and includes a recess capable of receiving the front crosspiece end of the vehicle. The back side of the diffuser includes: a pivoting axis capable of engaging with a corresponding receiving part provided on the heat exchangers, and an attaching part capable of engaging with a corresponding attaching part provided on the heat exchangers after one rotation of the side diffuser around pivoting axis.

15 Claims, 4 Drawing Sheets

U.S. PATENT DOCUMENTS

| | | | |
|---|---|---|---|
| 6,973,984 B2 * | 12/2005 | Cheron et al. | 180/68.1 |
| 7,451,844 B2 * | 11/2008 | Kunikata | 180/68.1 |
| 7,806,172 B2 * | 10/2010 | Seki et al. | 165/202 |
| 2003/0192727 A1 | 10/2003 | Mori et al. | |
| 2007/0107677 A1 | 5/2007 | Ito et al. | |

OTHER PUBLICATIONS

International Search Report issued Nov. 3, 2009 in PCT/FR09/50494 filed Mar. 23, 2009.

* cited by examiner

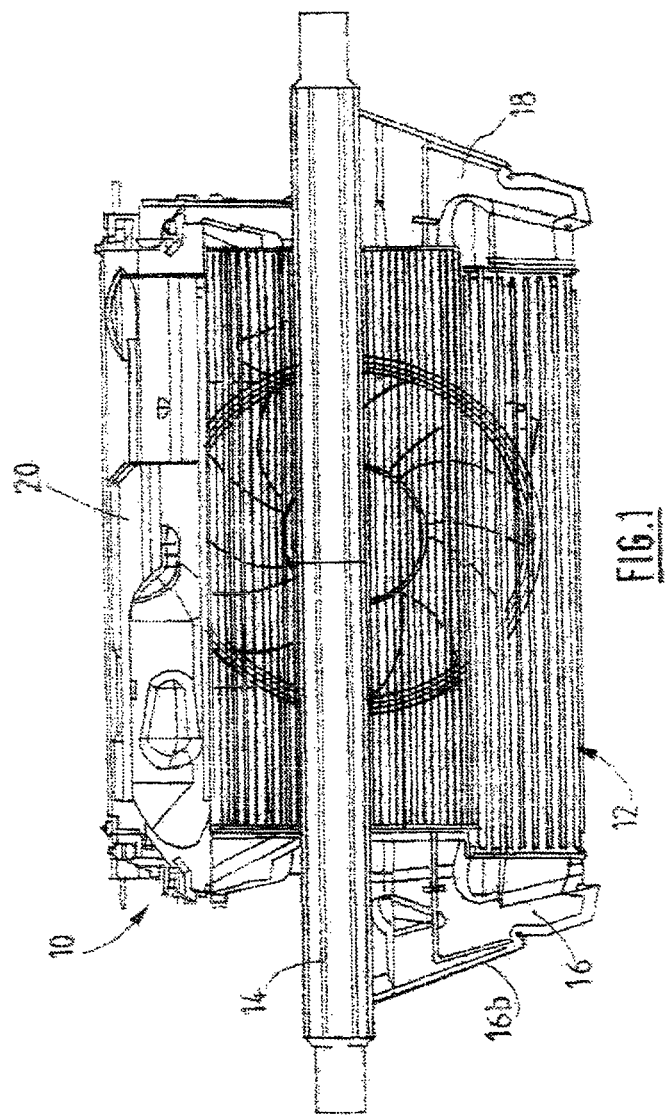

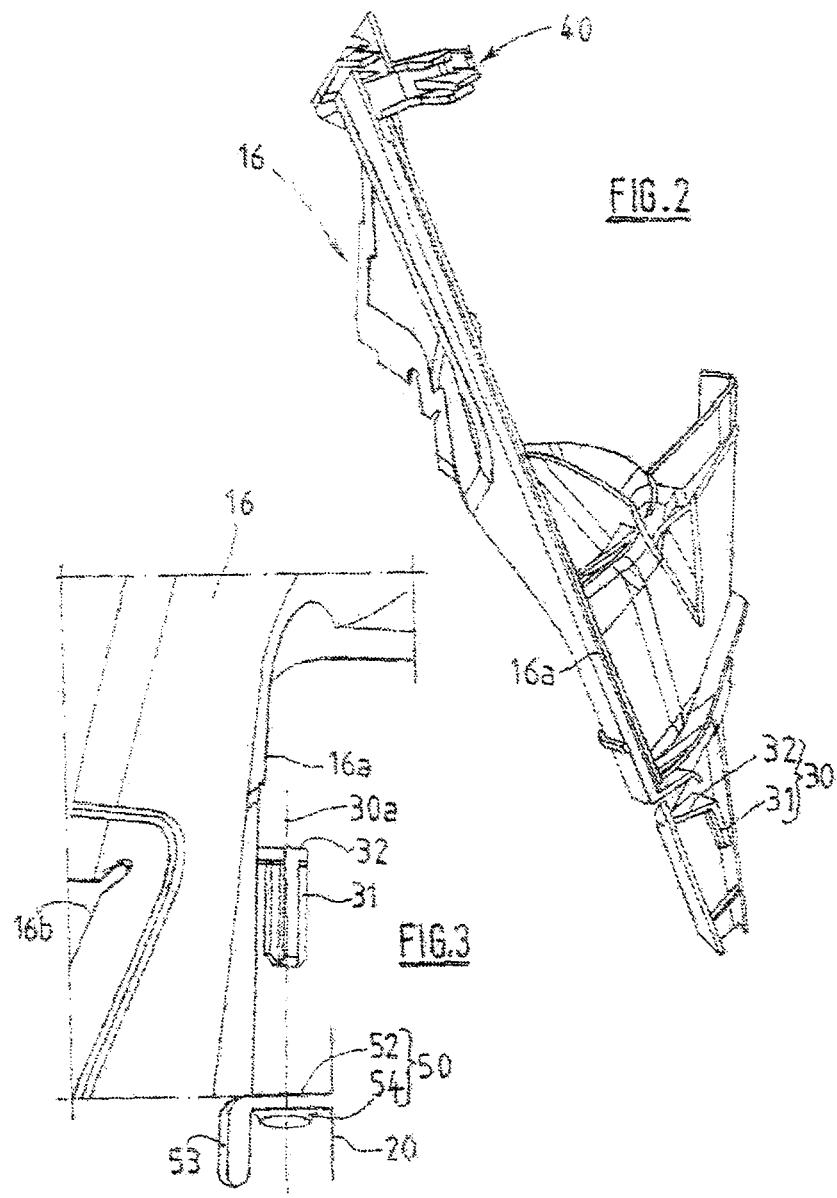

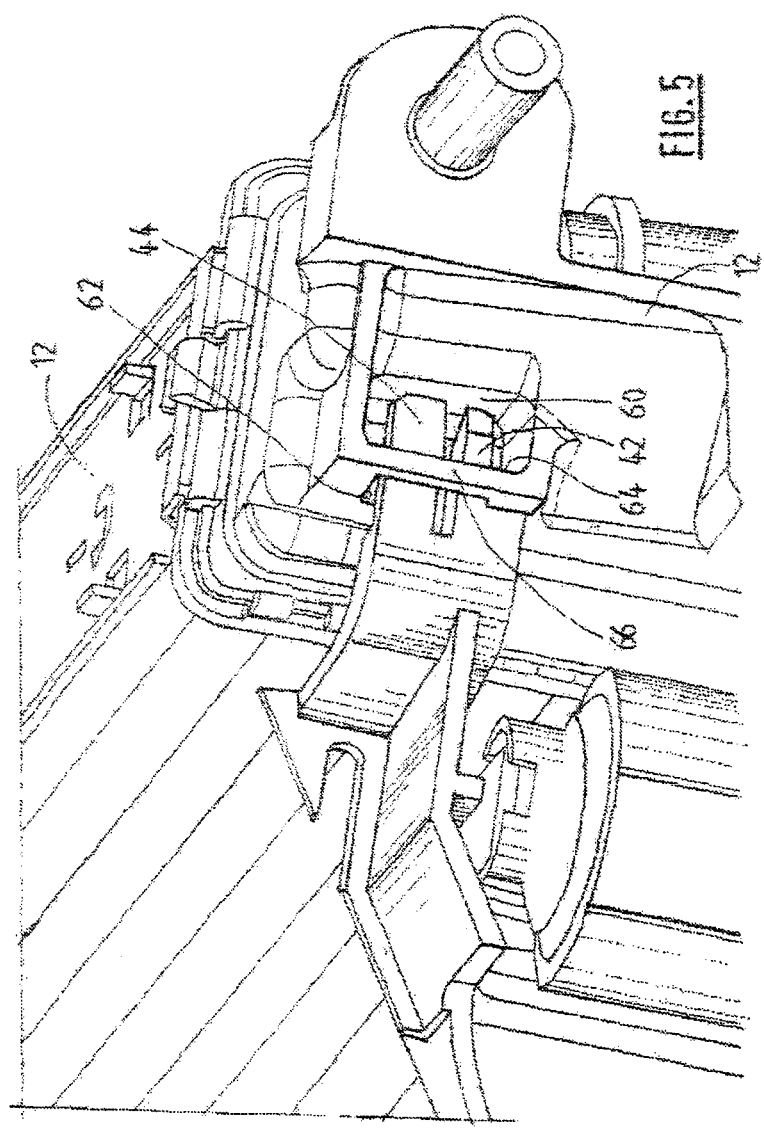

SIDE CONVERGER FOR VEHICLE FRONT FACE STRUCTURE, CORRESPONDING FRONT FACE STRUCTURE, AND METHOD FOR ASSEMBLING SUCH A STRUCTURE

BACKGROUND

The invention relates to a side converger for a vehicle front face structure, a corresponding front face structure, and a method for assembling such a front face structure.

DESCRIPTION OF THE RELATED ART

A vehicle possesses air inlets on its front face to allow a stream of air to enter to cool the engine. These air inlets consist of orifices in the front bumper of the vehicle. Engine cooling is obtained by means of heat exchangers (radiator, air cooler, condenser) in the front face, in front of the engine, with the air stream passing through them.

In order to direct the incoming air stream onto the heat exchangers, vehicles usually have convergers, which are usually plastic components arranged in such a way as to guide the air from the bumper air inlets to the heat exchangers. These convergers are thus located between the bumper and the heat exchangers. There are on the one hand the side convergers, positioned essentially vertically in the longitudinal direction of the vehicle, and on the other the upper converger, arranged essentially horizontally above the heat exchangers.

Between the heat exchangers and the front bumper, vehicles also have a forwardmost crossmember which runs across the area between the heat exchangers and the bumper. This forwardmost crossmember makes it difficult to mount the side convergers through which it passes.

The reason for this is that the side convergers cannot be mounted before the forwardmost crossmember is mounted, since their position prevents access to certain fixing points of the crossmember. In practice, the crossmember is mounted before the side convergers, making it difficult to mount the side convergers because of the reduced accessibility of their fixing points.

One solution is to make the side convergers in two parts, one part fixed to the heat exchangers and the other to the bumper. However, it is difficult to seal the region of the join between the two parts of the side converger.

Because of the presence of this crossmember, it is thus difficult to seal the region between the heat exchangers and the bumper, and air can be observed to be leaking through the region between the heat exchangers and the bumper, to the detriment of engine cooling.

It is now becoming necessary to improve the air flow through the heat exchangers in order to improve their cooling performance and thus make it possible to meet new pollution control regulations which have increased the cooling requirements for certain engines, such as diesel engines coupled to automatic transmissions.

There is therefore a need to improve the sealing of the region between the heat exchangers and the bumper in order to direct as much as possible of the incoming air stream onto the heat exchangers and thus improve the cooling of the engine.

BRIEF SUMMARY

A first object of the invention is to provide a side converger that can easily be mounted on heat exchangers after the forwardmost crossmember of a vehicle has been fitted.

A second object of the invention is to improve the sealing of the region between the exchangers and the bumper of the front structure of a vehicle.

For this purpose the subject of the invention relates to a side converger for a vehicle front face structure, designed to guide the air entering via air inlets in the bumper of the vehicle to the heat exchangers which are situated forward of the engine, said converger being formed of a plate whose rear edge is designed to bear on the heat exchangers and whose front edge is designed to bear on the bumper, said front edge also comprising a housing able to receive the forwardmost crossmember of said front face structure; which converger is characterized in that the rear edge of the converger is provided with:

a pivot pin able to engage with a corresponding receiving member on the heat exchangers, and a fixing member able to engage with a corresponding fixing member on the heat exchangers following rotation of the side converger about said pivot pin.

The side converger according to the invention can thus easily be located and fixed after the forwardmost crossmember has been fitted. The engagement of the pivot pin in the corresponding receiving member of the heat exchangers ensures correct location of the converger with respect to the heat exchangers, fixing being provided by the corresponding fixing members after a simple rotation of the side converger. This design means that the side converger can be made as a single part, thus limiting the air leaks observed with convergers made in two or more parts.

Advantageously, the fixing members are designed to allow reversible fixing of the side convergers, so that they can be removed.

Advantageously, the pivot pin is situated in the lower half of the rear edge.

More specifically, the pivot pin is situated generally below the housing for the crossmember, for instance at a distance from the latter, in an easily accessible area.

Advantageously, the fixing member is near the upper end of the rear edge.

More specifically, the fixing member is above the housing for the crossmember, at a distance from the latter, in an easily accessible area.

It is preferable to situate the pivot pin and the fixing member at a distance from each other so that the resulting two points, of location and fixing to the heat exchangers, are sufficiently far apart to ensure secure attachment of the converger to the heat exchangers.

Advantageously, the fixing member comprises a guide part able to guide it as it is inserted into the corresponding fixing member of the heat exchangers and a locking part able to lock onto the corresponding fixing member of the heat exchangers.

Such a design simplifies the fixing of the fixing member to the heat exchangers.

Advantageously, the fixing member is supported by a holder which is arcuate in a plane perpendicular to the pivot pin.

The dimensions and curvature of this arcuate, e.g. rounded, form are chosen to enable engagement of the fixing member on the converger with the corresponding fixing member on the heat exchangers following rotation about the pivot pin of the converger.

The invention also relates to a vehicle front face structure comprising heat exchangers designed to cool the vehicle's engine and a forwardmost crossmember, which structure is characterized in that the heat exchangers are provided with receiving members and fixing members able to engage with the pivot pin and the fixing member of a side converger according to the invention to locate and fix a side converger to the heat exchangers, on each side of said heat exchangers.

Lastly, the invention relates to a method for assembling a vehicle front face structure comprising heat exchangers, a forwardmost crossmember, and two side convergers according to the invention, the heat exchangers being provided with receiving members and with fixing members able to engage with the pivot pin and the fixing member of a side converger according to the invention to locate and fix a side converger to the heat; exchangers, on each side of said heat exchangers, the method comprising the following steps:

(i) the forwardmost crossmember is fixed;
(ii) the side convergers are located between the forwardmost crossmember and the heat exchangers by inserting the pivot pins of the convergers in the corresponding receiving members of the heat exchangers, each converger now being in an intermediate position of assembly, and
(iii) the convergers are pivoted about their pin until their fixing member engages with the corresponding fixing member of the heat exchangers.

BRIEF DESCRIPTION OF THE DRAWINGS

The invention will now be described with reference to the appended non-restrictive drawings, in which:

FIG. 1 is a front view of a motor vehicle front face structure according to the invention;

FIG. 2 is a perspective view of a side converger according to the invention;

FIG. 3 shows the side converger from FIG. 2 and its pivot pin;

FIG. 5 shows the fixing members of the side converger engaged with the heat exchangers.

DETAILED DESCRIPTION

Figure 4:
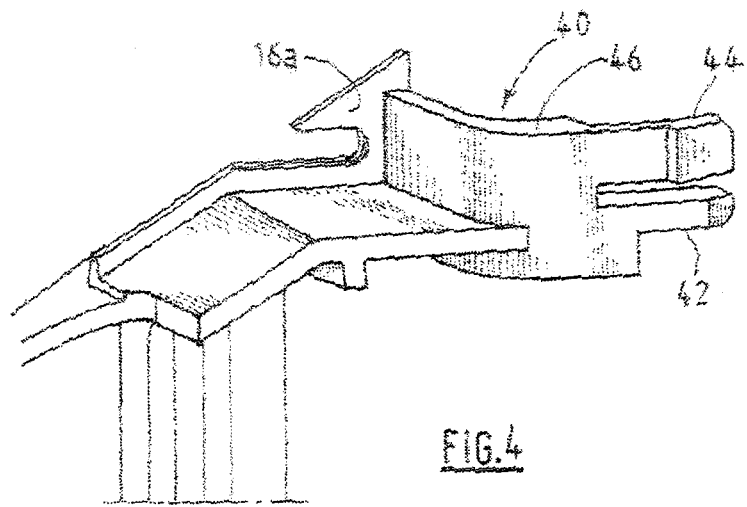
FIG. 4 is an enlargement of the fixing member of the converger from FIG. 2.

In this description the directions front and rear refer to the front and rear directions of the vehicle. Similarly the longitudinal direction means the longitudinal direction of the vehicle.

FIG. 1 shows a vehicle front face structure 10 comprising heat exchangers 12 designed to cool the vehicle's engine.

This front structure also includes a forwardmost crossmember 14 situated between the heat exchangers 12 and the front bumper of the vehicle (not shown).

Also visible in FIG. 1 are two side convergers 16, 18 and an upper converger 20. These are designed to guide the air entering via air inlets in the vehicle bumper to the heat exchangers 12 which are situated forward of the engine of the vehicle.

The side convergers 16, 18 are symmetrical about a vertical longitudinal plane, so the structure of only one of them will be described with reference to the figures.

The side converger 16 is formed of a plate whose rear edge 16a is designed to bear on the heat exchangers 12 and whose front edge 16b is designed to bear on the bumper (not shown), said front edge 16b also comprising a housing able to receive the forwardmost crossmember 14 of the vehicle. The rear 16a and front 16b edges extend in an essentially vertical direction. In the example the converger is formed of a plate made in one piece.

According to the invention, the rear edge 16a of the converger is provided with:

a pivot pin 30 able to engage with a corresponding receiving member 50 on the heat exchangers 12, and a fixing member 40 able to engage with a corresponding fixing member 60 on the heat exchangers 12 following rotation of the side converger about said pivot pin 30.

In the example depicted, the pivot pin 30 is situated in the lower half of the rear edge 16a, and more particularly beneath the housing designed to receive the forwardmost crossmember 14.

This pivot pin 30 is in the form of an essentially vertical rod 31 of axis 30a attached to a supporting tab 32, the unattached end of the rod pointing down relative to the converger. This unattached end is preferably beveled or conical to facilitate its insertion into the corresponding fixing member of the heat exchangers.

The corresponding receiving member 50 of the heat exchangers is formed by a ring 52, conically shaped to facilitate the insertion of the rod 31, supported by a tab 54. This tab is continued in the form of an essentially vertical lip 53 that extends alongside the rod 31, essentially for the full height of the latter, between the rod and the converger, when the converger is fixed to the heat exchangers. The lip 53 performs a function of guiding and securing the rod 31.

In a variant, the receiving member may be a sheath or a sleeve.

In the example depicted, the fixing member 40 of the converger is near the upper end of the rear edge. In particular it is above the housing for the forwardmost crossmember 14.

The fixing member 40 comprises a guide part 42 able to guide it as it is inserted into the corresponding fixing member 60 of the heat exchangers, and a locking part 44 able to lock onto the corresponding fixing member 60 of the heat exchangers.

The fixing member 40 is also supported by a holder 46 which is arcuate in a plane perpendicular to the pivot pin 30.

Figure 6:
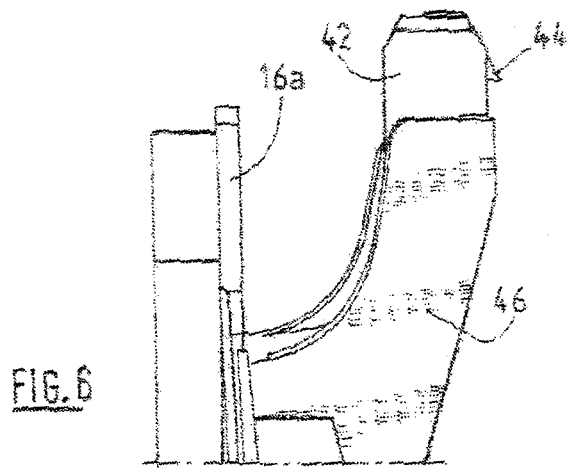
FIG. 6 is a bottom view of the fixing member from FIG. 4.

As can be seen in FIGS. 4 and 6, the guide part 42 is formed of an essentially horizontal tab whose end is beveled to facilitate its insertion into the corresponding fixing member 60 of the heat exchangers. The locking part 44 is formed of a snap-fastening tab.

As can be seen in FIG. 5, the fixing member is formed of a cavity 60 comprising a first opening 62 allowing the guide part 42 and the locking part 44 to be inserted. The width of the guide part 42 is approximately the same as the width of this orifice 60, which allows the fixing member to be positioned correctly. The cavity 60 comprises a second opening 64 in a plane perpendicular to the plane of the first opening 62. This second opening 64 is sufficiently close to the first opening 62 to form with the latter a post 66, with which the locking part 44 will be able to engage, in the example illustrated by snap fastening. The second opening 64 enables a person to check that the locking part 44 is located correctly and performing its converger fixing function. It also allows access to this locking part 44, which can thus be disengaged and easily removed from the side converger.

The heat exchangers are provided with receiving members 50 and fixing members 60 able to engage both with the pivot pin and with the fixing member of a side converger according to the invention for the location and fixing of a side converger to the heat exchangers, on each side of the latter. These members 50, 60 are therefore situated on the vertical side edges of the heat exchangers.

The above-described vehicle front face structure comprising the heat exchangers 12, the forwardmost crossmember 14 and two side convergers 16, 18 is assembled in the following way:

(i) the forwardmost crossmember 14 is fixed;

(ii) the side convergers 16, 18 are located between the forwardmost crossmember 14 and the heat exchangers 12 by inserting the pivot pins 30 of the convergers in the corresponding receiving members 50 of the heat exchangers, each converger now being in an intermediate position of assembly, and (iii) the convergers 16, 18 are pivoted about their pin 30 until their fixing member 40 engages with the corresponding fixing member 60 of the heat exchangers.

The intermediate position of assembly corresponds to a position in which the converger is vertical but offset by a predetermined angle with respect to the final vertical position of the converger.

The pivot pins and fixing members of the convergers according to the invention consequently locate and fix each side converger to the heat exchangers, on each side of the latter.

The side convergers can be mounted quickly and easily despite the presence of the forwardmost crossmember, with a good seal between the side convergers and the surrounding parts. To this end, the edges of the convergers may be provided with flexible seals.

The invention claimed is:

1. A side converger for a vehicle front face structure, configured to guide air entering via air inlets in a bumper of the vehicle to heat exchangers situated forward of an engine of the vehicle, the side converger comprising:
    a plate whose rear edge is configured to bear on the heat exchangers and whose front edge is configured to bear on the bumper, the front edge also comprising a housing configured to receive a forwardmost crossmember of the vehicle front face structure;
    the rear edge of the side converger comprising:
        a pivot pin configured to engage with a corresponding receiving member on the heat exchangers, and
        a fixing member configured to engage with a corresponding fixing member on the heat exchangers following rotation of the side converger about the pivot pin.

2. The side converger as claimed in claim 1, wherein the pivot pin is situated in a lower half of the rear edge of the side converger.

3. The side converger as claimed in claim 1, wherein the fixing member is near an upper end of the rear edge of the side converger.

4. The side converger as claimed in claim 1, wherein the fixing member comprises a guide part configured to guide it the fixing member into the corresponding fixing member of the heat exchangers and a locking part configured to lock onto the corresponding fixing member of the heat exchangers.

5. The side converger as claimed in claim 1, wherein the fixing member is supported by a holder that is arcuate in a plane perpendicular to the pivot pin.

6. The side converger as claimed in claim 5, wherein the holder has a form configured to engage the fixing member on the side converger with the corresponding fixing member on the heat exchangers following rotation about the pivot pin of the side converger.

7. The side converger as claimed in claim 1, wherein the side converger is made of a single part.

8. The side converger as claimed in claim 1, wherein the fixing member of the side converger is reversible.

9. The side converger as claimed in claim 1, wherein the pivot pin is situated below the housing of the forwardmost crossmember, at a distance from the forwardmost crossmember.

10. The side converger as claimed in claim 1, wherein the fixing member is situated above the housing of the forwardmost crossmember, at a distance from the forwardmost crossmember.

11. The side converger as claimed in claim 1, wherein the pivot pin and the fixing member are spaced apart to ensure secure attachment of the side converger to the heat exchangers.

12. The side converger as claimed in claim 1, wherein the front edge of the side converger and the rear edge of the side converger extend in an essentially vertical direction.

13. The side converger as claimed in claim 1, wherein the pivot pin points down relative to the converger.

14. A vehicle front face structure comprising:
    heat exchangers configured to cool an engine of the vehicle; and
    a forwardmost crossmember,
    wherein the heat exchangers include receiving members and fixing members configured to engage with a pivot pin and a fixing member of a side converger as claimed in claim 1, to locate and fix a side converger to the heat exchangers, on each side of the heat exchangers.

15. A method for assembling a vehicle front face structure including heat exchangers, a forwardmost crossmember, and two side convergers as claimed in claim 1, the heat exchangers including receiving members and fixing members configured to engage with the pivot pin and the fixing member of a side converger to locate and fix a side converger to the heat exchangers, on each side of said heat exchangers, the method comprising:
    fixing the forwardmost crossmember;
    locating the side convergers between the forwardmost crossmember and the heat exchangers by inserting the pivot pins of the convergers in the corresponding receiving members of the heat exchangers, each converger being in an intermediate position of assembly; and
    pivoting the side convergers about their pin until their fixing member engages with the corresponding fixing member of the heat exchangers.

* * * * *